(12) United States Patent
Lee et al.

(10) Patent No.: US 10,943,527 B2
(45) Date of Patent: Mar. 9, 2021

(54) PORTABLE ELECTRONIC DEVICE AND OPERATING METHOD THEREOF

(71) Applicant: Chiun Mai Communication Systems, Inc., New Taipei (TW)

(72) Inventors: Kwang-Pi Lee, New Taipei (TW); Szu-Tso Lin, New Taipei (TW); Po-Ching Huang, New Taipei (TW); Chieh-Ming Cheng, New Taipei (TW); Wen-Lung Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/261,996

(22) Filed: Jan. 30, 2019

(65) Prior Publication Data

US 2019/0244560 A1   Aug. 8, 2019

(30) Foreign Application Priority Data

Feb. 8, 2018   (CN) .......................... 201810130700.0

(51) Int. Cl.
*G09G 3/32* (2016.01)

(52) U.S. Cl.
CPC ........... *G09G 3/32* (2013.01); *G09G 2310/08* (2013.01); *G09G 2360/14* (2013.01)

(58) Field of Classification Search
CPC .. G09G 3/32; G09G 2310/08; G09G 2360/14; G09G 2330/021; G09G 2360/144; G06F 1/3206; G06F 1/1686; G06F 1/1626; G06F 1/3265; G06F 1/1643; G06F 1/1647; G06F 1/1637; H04M 1/0264; H04M 1/0266; H04M 1/72566; H04M 1/72569; H04M 2250/12; H04W 52/027
See application file for complete search history.

(56) References Cited

U.S. PATENT DOCUMENTS

| | | | | |
|---|---|---|---|---|
| 8,154,582 | B2 * | 4/2012 | Border | H04N 7/144 345/50 |
| 8,269,754 | B2 * | 9/2012 | Nagata | G06F 3/1423 345/207 |
| 10,062,322 | B2 * | 8/2018 | Evans, V | G06F 1/163 |
| 10,254,791 | B1 * | 4/2019 | Ting | G06F 1/165 |
| 2014/0063049 | A1 * | 3/2014 | Armstrong-Muntner | G03B 9/00 345/619 |
| 2015/0061881 | A1 * | 3/2015 | Jeon | H04M 1/0245 340/687 |

(Continued)

FOREIGN PATENT DOCUMENTS

| | | |
|---|---|---|
| CN | 105094307 A | 11/2015 |
| CN | 106774685 A | 5/2017 |
| CN | 106878564 A | 6/2017 |

*Primary Examiner* — Bryan Earles
(74) *Attorney, Agent, or Firm* — ScienBiziP, P.C.

(57) ABSTRACT

A portable electronic device with large display screen-to-body includes a housing, a first display, a circuit board, and an optical module. The first display is a transparent display. The optical module is electrically connected to the circuit board and positioned below the first display. The first display, the optical module, and the circuit board are received in the housing, the optical module is configured to receive external light passing through the first display even as the first display is displaying images. Operating methods for the portable electronic device in various modes are also provided.

2 Claims, 18 Drawing Sheets

(56) References Cited

U.S. PATENT DOCUMENTS

| | | | |
|---|---|---|---|
| 2015/0065207 A1* | 3/2015 | Hong | G06F 1/1677 |
| | | | 455/575.3 |
| 2016/0379603 A1* | 12/2016 | Zhu | G06F 1/3265 |
| | | | 345/592 |
| 2017/0004798 A1* | 1/2017 | Park | G09G 3/3666 |
| 2017/0123452 A1* | 5/2017 | Evans, V | G06F 1/1686 |
| 2017/0123454 A1* | 5/2017 | Evans, V | H04N 5/2258 |
| 2017/0162111 A1* | 6/2017 | Kang | H01L 27/3276 |
| 2018/0129268 A1* | 5/2018 | Lee | G06F 1/3287 |
| 2018/0260079 A1* | 9/2018 | Zhang | G06F 3/0481 |
| 2018/0348049 A1* | 12/2018 | Yoon | G09G 3/3406 |

\* cited by examiner

//<br>
PORTABLE ELECTRONIC DEVICE AND OPERATING METHOD THEREOF

FIELD

The subject matter herein generally relates to a portable electronic device, especially relates to a portable electronic device having a high screen-to-body ratio and an operating method of the portable electronic device.

BACKGROUND

Most portable electronic devices, such as mobile phones and tablet computers, normally have a recess for a non-display area in a display panel, the recess is for placing a plurality of optical elements, such as a camera, a proximity sensor, and a light sensor. However, when the display is switched-off, the recess is dark, which may cause a bad visual effect. And the non-display area reduces a screen-to-body ratio. Therefore, higher screen-to-body ratios for portable electronic devices are desired.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
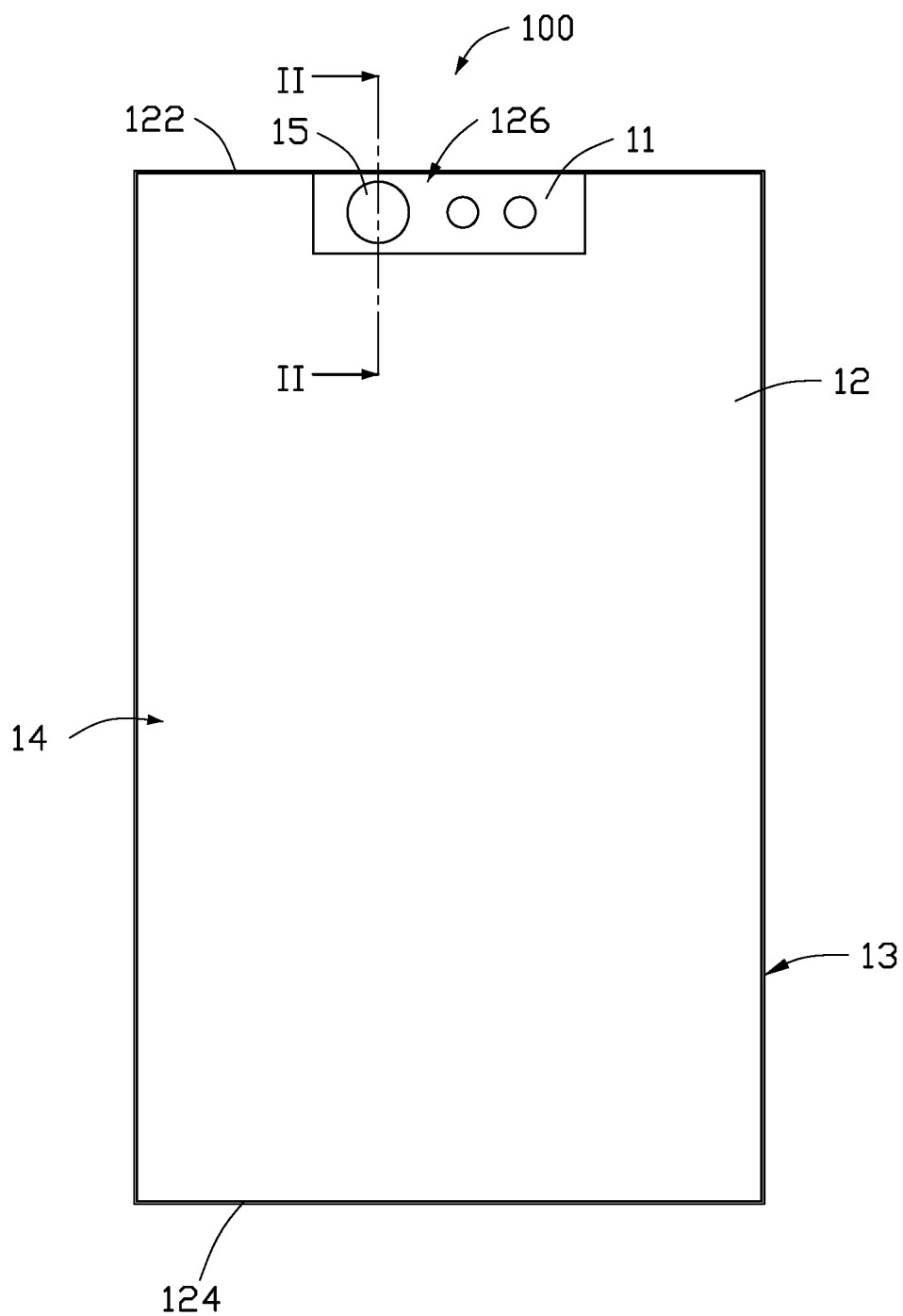
FIG. 1 is a plane view of a first embodiment of a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
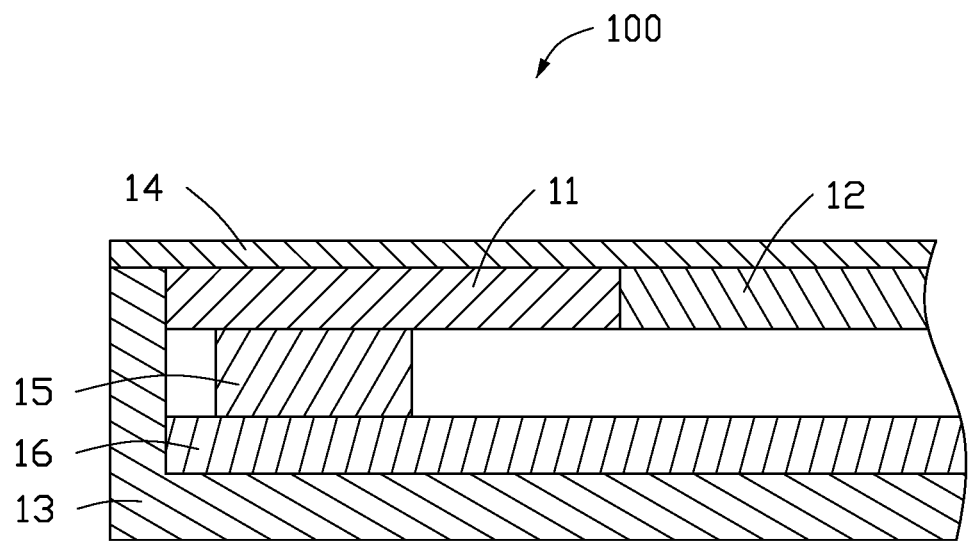
FIG. 2 is a cross-sectional view along line II-II of the portable electronic device shown in FIG. 1.

FIGS. 1 and 2 illustrate a first embodiment of a portable electronic device (portable electronic device 100). The portable electronic device 100 can be, but is not limited to, a mobile phone, a personal digital assistant, or a tablet computer. The portable electronic device 100 includes a first display 11, a second display 12, a housing 13, a front cover 14, an optical module 15, and a circuit board 16.

The first display 11, the second display 12, the optical module 15, and the circuit board 16 are received in the housing 13. The first display 11 and the second display 12 are parallel to each other and are on the same plane. The optical module 15 is electrically connected to the circuit board 16 and is positioned below the first display 11. Preferably, the optical module 15 is sandwiched between the first display 11 and the circuit board 16. The front cover 14 covers the first display 11 and the second display 12. In at least one embodiment, the front cover 14 is made of transparent glass, and the first display 11 and the second display 12 are visible through the front cover 14.

Referring to FIGS. 1 and 2, the second display 12 is substantially rectangular and includes a first end 122 and a second end 124. The first end 122 and the second end 124 are supported by an upper frame and a lower frame of the housing 13. The first end 122 defines a recess 126 in a middle portion. The first display 11 is arranged in an opening formed by the recess 126 and the upper frame of the housing 13. In at least one embodiment, the second display 12 is a non-transparent display. Such display can be but is not limited to a liquid crystal display (LED) or an organic light-emitting diode (OLED) display. Such display also has a touch function. The first display 11 is a transparent display, such as a micro LED (μ LED) display, but is not limited thereto. In at least one embodiment, the first display 11 can display a first interface, the first interface is a minor interface. The second display 12 displays a second interface, the second interface is a major and main interface, such as a user interface.

Figure 3:
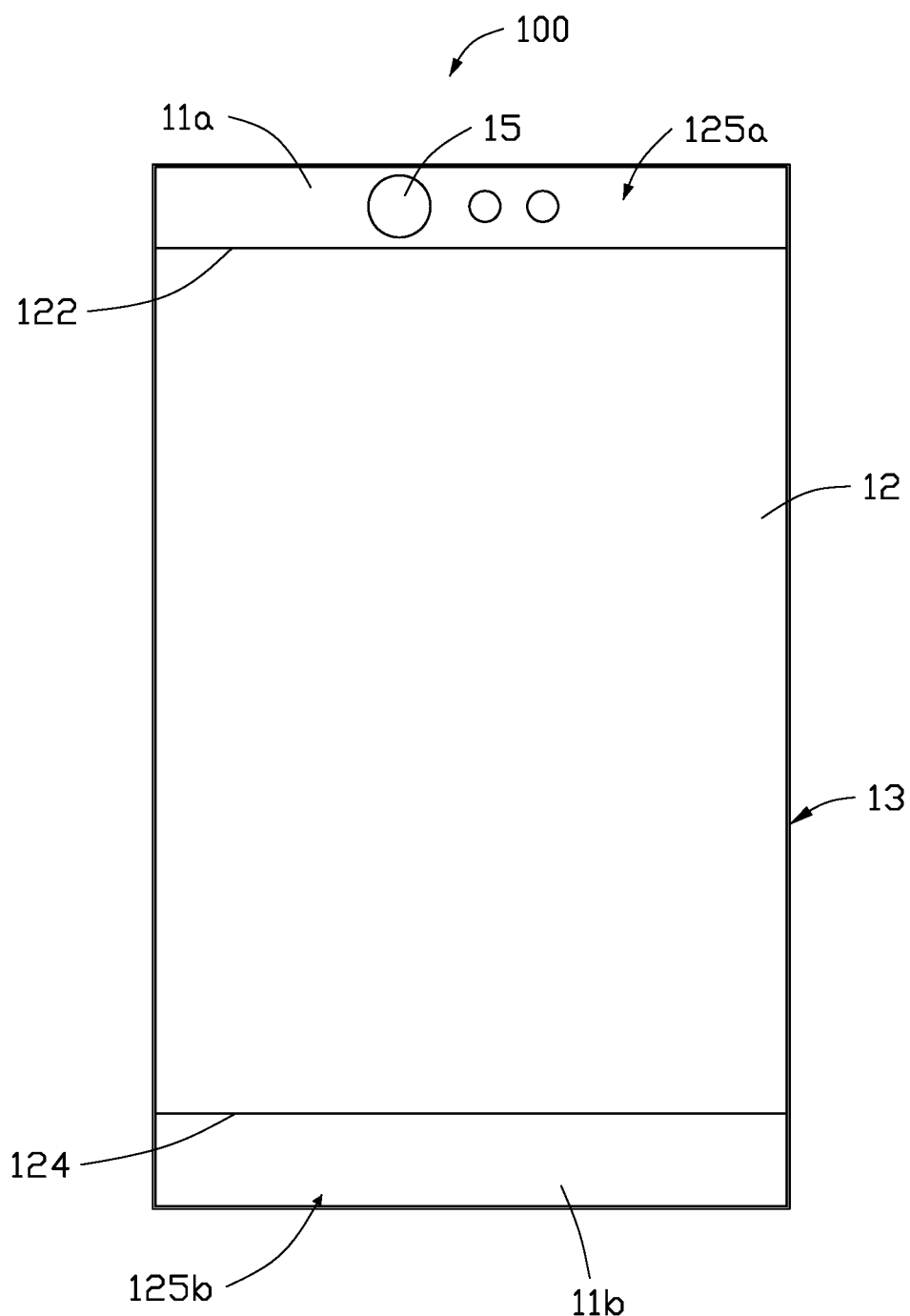
FIG. 3 is a plane view of a second embodiment of a portable electronic device.

FIG. 3 illustrates a second embodiment of the portable electronic device 100. The first end 122 of the second display 12 and the upper frame of the housing 13 form a receiving opening 125a, the receiving opening 125a receives a first display 11a. The second end 124 of the second display 12 and the lower frame of the housing 13 form a receiving opening 125b, the receiving opening 125b receives a first display 11b.

Figure 4:
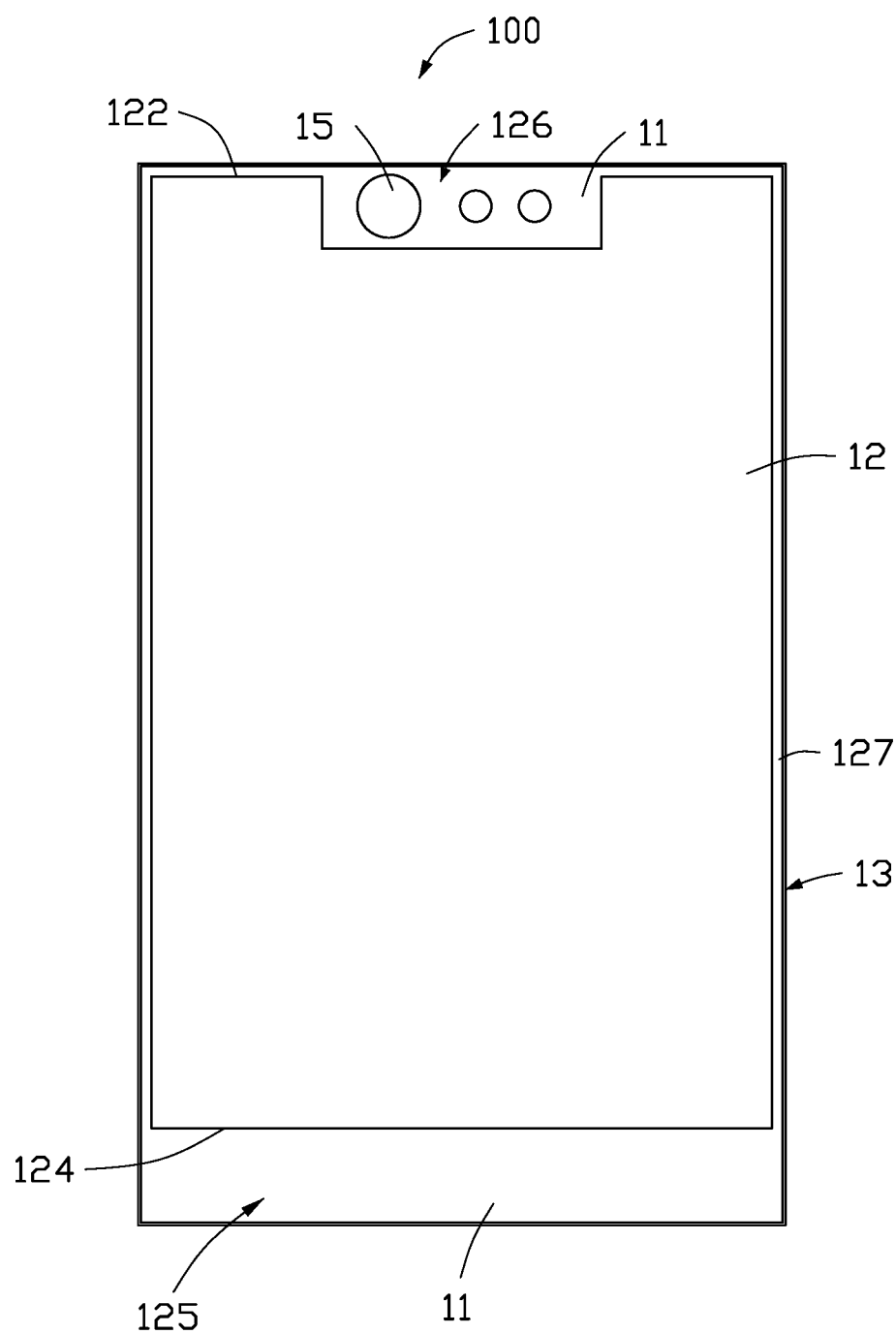
FIG. 4 is a plane view of a third embodiment of a portable electronic device.

FIG. 4 illustrates a third embodiment of the portable electronic device 100. The first end 122 of the second display 12 defines a recess 126 in a middle portion. The second end 124 of the second display 12 and the lower frame of the housing 13 form a receiving opening 125. Two side frames and the upper frame of the housing 13 and second display 12 form a gap 127. The gap 127, the receiving opening 125, and the recess 126 cooperate to support the first display 11. In other words, in the third embodiment, the first display 11 surrounds the second display 12. The optical module 15 is arranged in the recess 126 and positioned below the first display 11.

Figure 5:
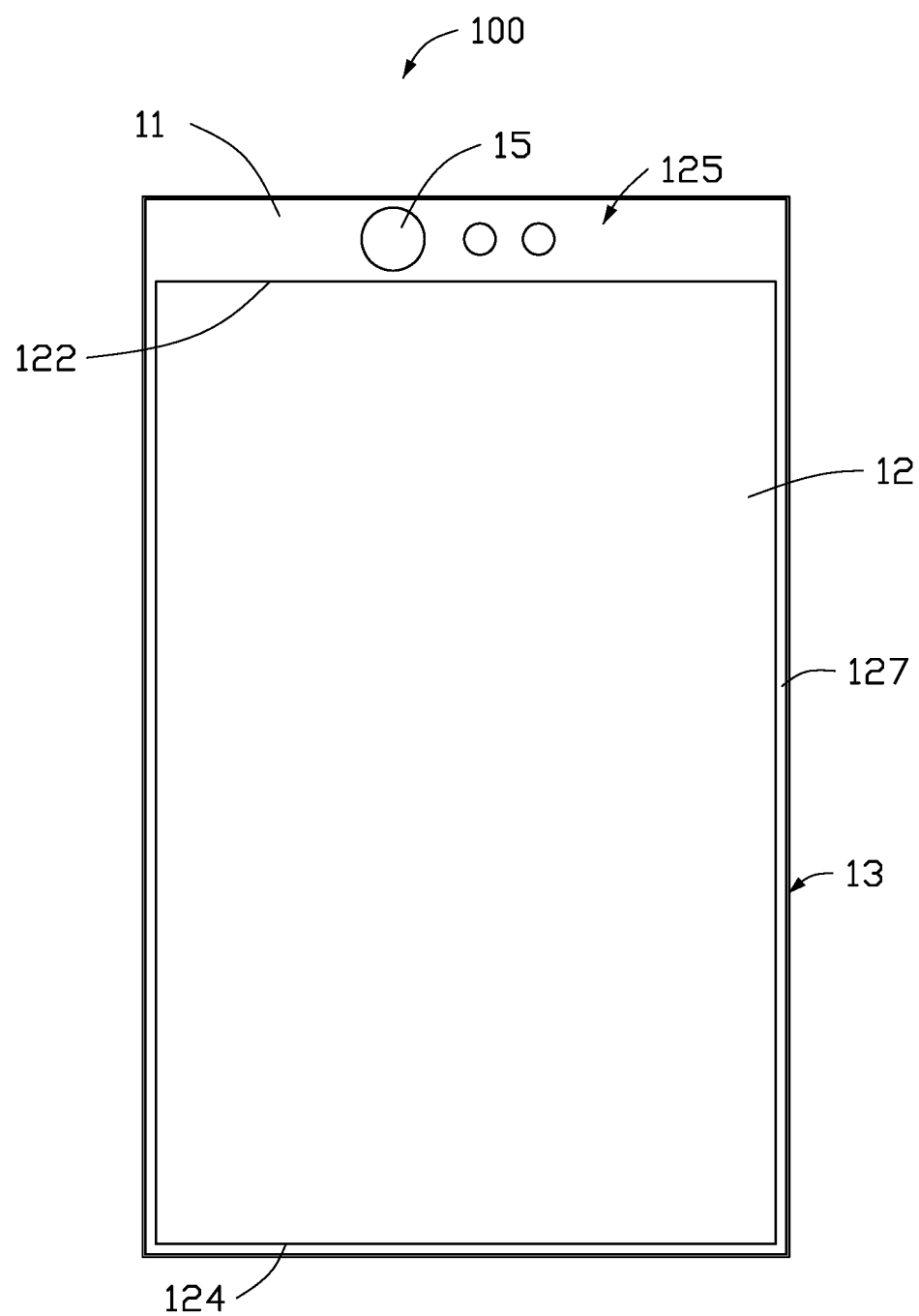
FIG. 5 is a plane view of a fourth embodiment of a portable electronic device.

FIG. 5 illustrates a fourth embodiment of the portable electronic device 100. The first end 122 of the second display 12 and the upper frame of the housing 13 form the receiving opening 125. Two side frames and the lower frame of the housing 13 and second display 12 form the gap 127. The gap 127 and the receiving opening 125 cooperated to support the first display 11. In other words, in the fourth embodiment, the first display 11 surrounds the second display 12. The optical module 15 is arranged in the receiving opening 125 and positioned below the first display 11.

In the third and fourth embodiments, the first display 11 may present continuous patters produced by persistence of vision when swaying the portable electronic device 100 on an effect plane according to display fusion technology.

Figure 6:
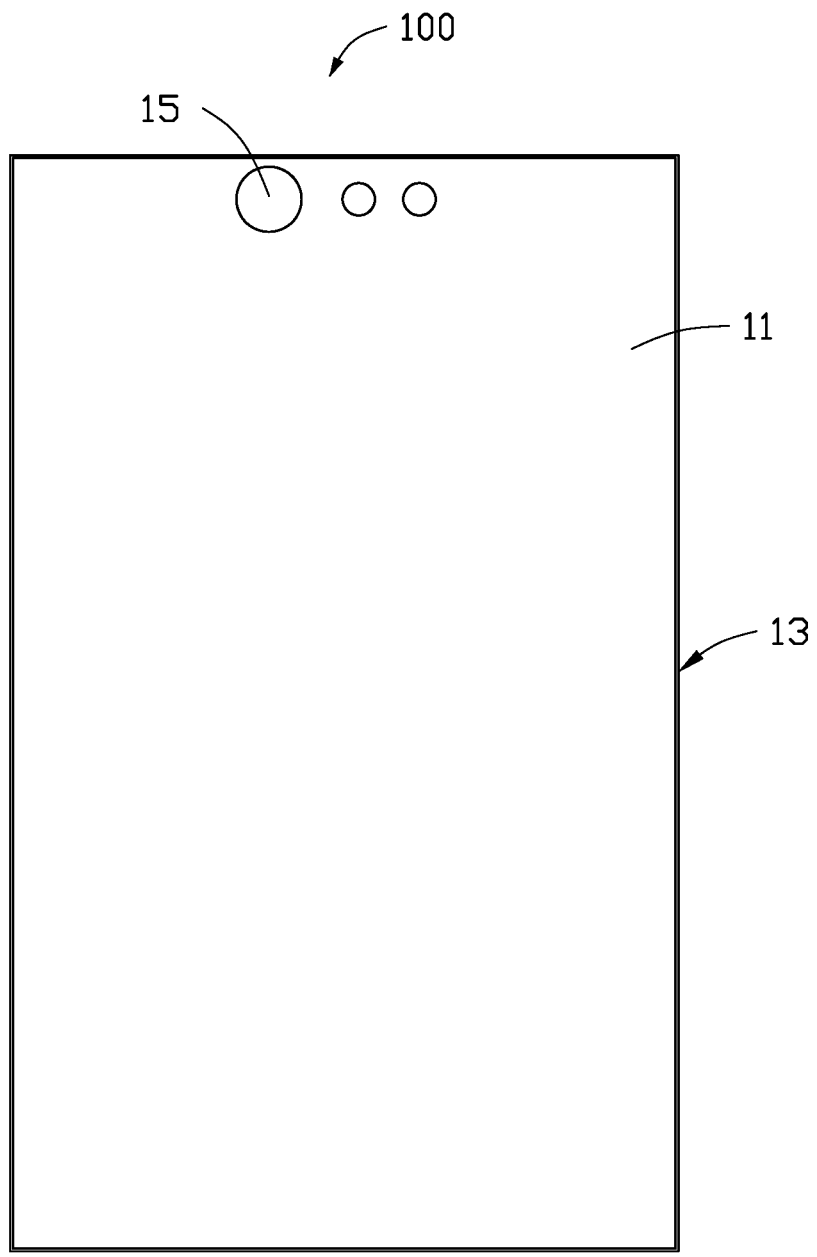
FIG. 6 is a plane view of a fifth embodiment of a portable electronic device.

FIG. 6 illustrates a fifth embodiment of the portable electronic device 100. The portable electronic device 100 includes only the first display 11. Each end of the first display 11 is supported by the frames of the housing 13. The optical module 15 is arranged in the housing 13 and positioned below an end of the first display 11 close to the upper frame of the housing 13.

Figure 7:
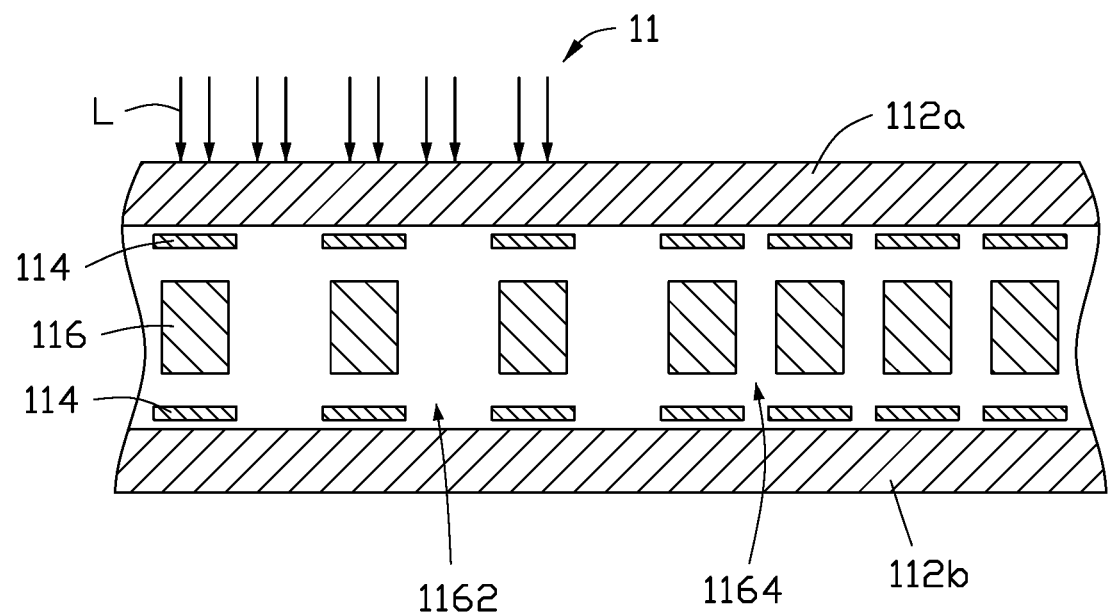
FIG. 7 is a cross-sectional view of a first display of the portable electronic device shown in FIG. 1.

Referring to FIG. 7, the first display 11 includes at least one base board 112a/112b, a plurality of electrodes 114, and a plurality of RGB light-emitting diodes (LEDs) 116. The RGB LEDs 116 are mounted on the base board 112a/112b. In at least one embodiment, the first display 11 includes two base boards 112a, 112b. The base boards 112a, 112b are made of transparent material, such as glass or Polyimide (PI), but are not limited thereto. The electrodes 114 are transparent electrodes, such as Indium Tin Oxide (ITO) electrodes, but are not limited thereto. The electrodes 114 are arranged on opposite sides of the RGB LEDs 116 and are electrically connected to the RGB LEDs 116. The electrodes 114 are configured to switch the RGB LEDs 116 on and off. Each pair of ITO electrodes 114 is corresponding to one RGB LED 116. In at least one embodiment, an arrangement of the RGB LEDs 116 includes a low density area 1162 and a high density area 1164. The optical module 15 is correspondingly located in the low density area 1162, for light L to pass easily through the low density area 1162 and be received by the optical module 15. Therefore, a light transmittance of the first display 11 is increased. In at least one embodiment, the optical module 15 is attached to a lower surface of the base board 112b corresponding to the low density area 1162.

Figure 8:
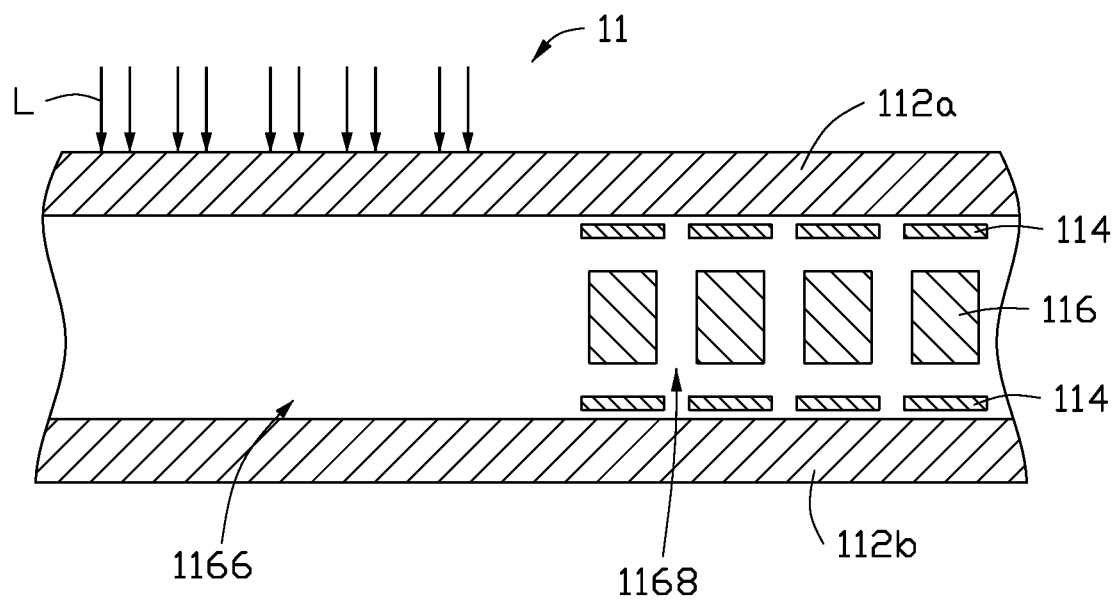
FIG. 8 is a cross-sectional view of another embodiment of a first display of the portable electronic device shown in FIG. 1.

Referring to FIG. 8, in another embodiment, an arrangement of the RGB LEDs 116 includes a blank area 1166 and a populated area 1168. The optical module 15 is correspondingly located in the blank area 1166, where light L can pass through the blank area 1166 and be received by the optical module 15. Therefore, a light transmittance of the first display 11 is increased. In this embodiment, the optical module 15 is attached to lower surface of the base board 112b corresponding to the blank area 1166.

Figure 9:
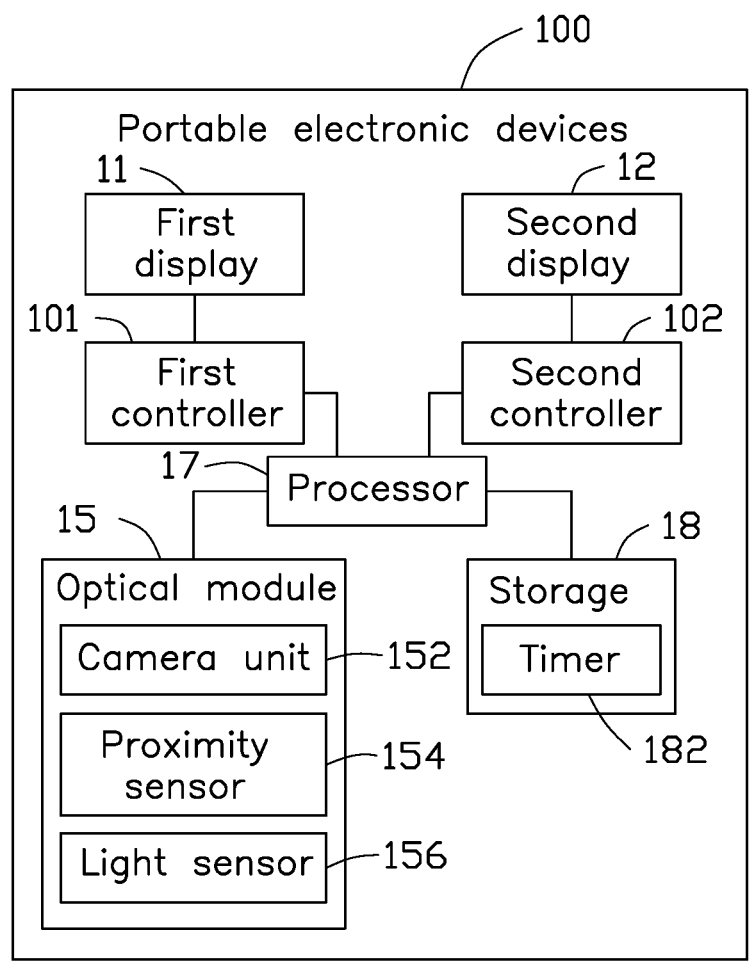
FIG. 9 is a block diagram of an embodiment of a portable electronic device.

FIG. 9 illustrates a block diagram of the portable electronic device 100. The portable electronic device 100 further includes a processor 17 and a storage 18. The processor 17 and the storage 18 are arranged on the circuit board 16. The processor 17 is electrically connected to the first display 11, the second display 12, the optical module 15, and the storage 18, and is configured to control and process data of these electronic elements. The optical module 15 includes at least one optical element. In at least one embodiment, the optical module 15 includes a camera unit 152, a proximity sensor 154, and a light sensor 156. The camera unit 152 can be a front camera of the portable electronic device 100, configured to capture pictures. The proximity sensor 154 is configured to detect a distance between the portable electronic device 100 and the user. The light sensor 156 is configured to detect brightness of light of the environment. The storage 18 is configured to store data. In at least one embodiment, the storage 18 includes a timer 182. The timer 182 is configured to count a predetermined time period. In other embodiments, the timer 182 can be replaced by a hardware timer 182.

The portable electronic device 100 further includes a first controller 101 and a second controller 102. The first display 11 and the second display 12 are electrically connected to the processor 17 respectively through the first controller 101 and the second controller 102. The first controller 101 and the second controller 102 may have different capabilities and functions, such as different user interfaces. In at least one embodiment, the first controller 101 includes a first connecting interface, such as a serial peripheral interface (SPI), and is electrically connected to the processor 17 through the first connecting interface. The second controller 102 includes a second connecting interface, such as a mobile industry processor interface (MIPI), and is electrically connected to the processor 17 through the second connecting interface. The first connecting interface and the second connecting interface may have different quantities of pins. The processor 17 controls the first display 11 and the second display 12 through the first controller 101 and the second controller 102 respectively.

The portable electronic device 100 can be operated in multiple modes. Such multiple modes include but are not limited to a user interface (UI) operation mode, a sleep mode, a call mode, a camera mode, and a light detecting mode. Among the multiple modes of the portable electronic device 100, the first display 11, the second display 12, and different optical elements of the optical module 15 have different functions. The processor 17 detects different trigger events, and switches and controls the multiple modes of the portable electronic device 100 according to the detected trigger event. In at least one embodiment, the trigger events can be but are not limited to operations to the first display 11, the second display 12, the camera unit 152, the proximity sensor 154, the light sensor 156, the timer 182, and other electronic elements by the user. Such operations can be but are not limited to use initiated operations, the timer 182 counted to a predetermined time period, the light sensor 156 sensed blocked light, etc.

Figure 10:
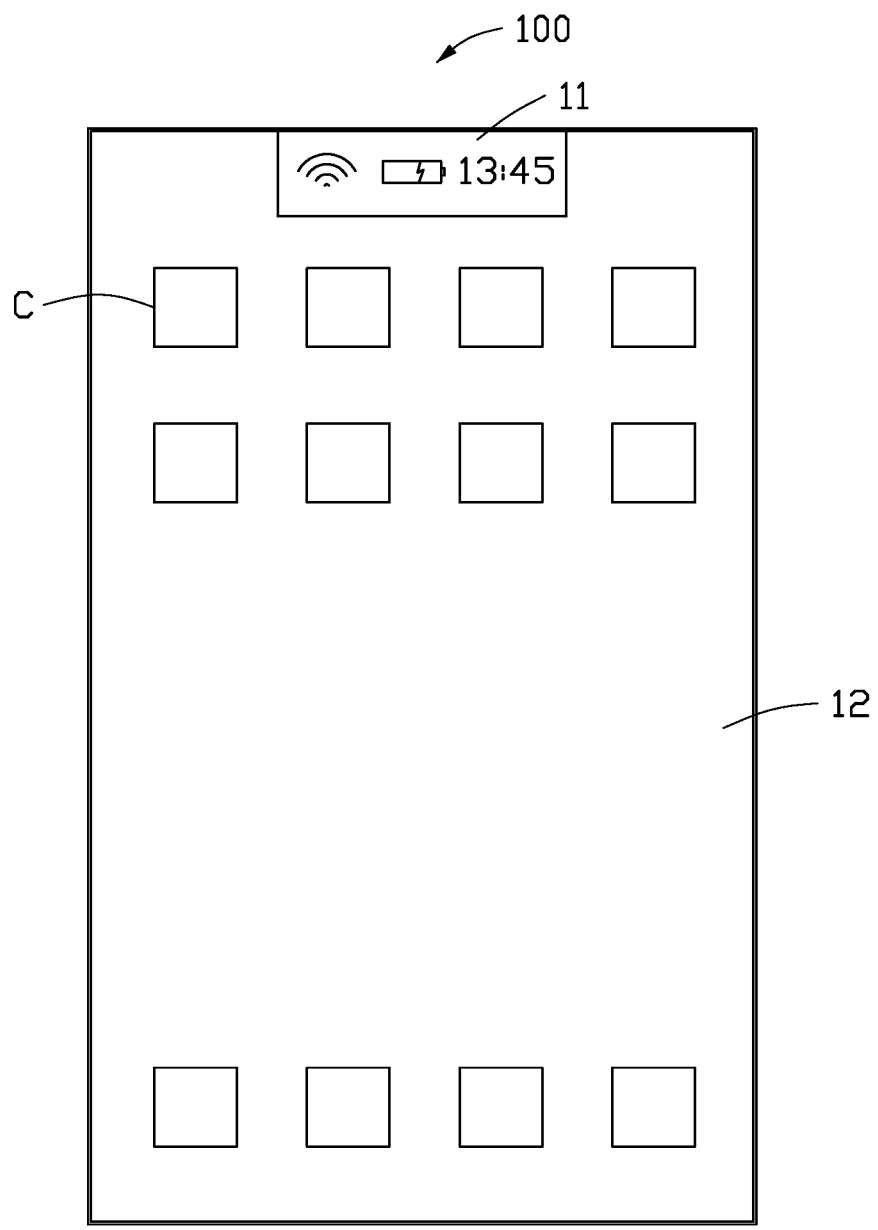
FIG. 10 is a view of an embodiment of an interface of a portable electronic device in a UI operation mode.

Referring to FIG. 10, in the UI operation mode, the first display 11 is switched-on, the second display 12 is switched-on, and the camera unit 152, the proximity sensor 154, and the light sensor 156 are switched-off. In the UI operation mode, the second display 12 displays a user interface, which may include application icons C or application interfaces, etc. The first display 11 displays a minor interface, which may include a signal connection status icon, a battery icon, and time information, etc. In at least one embodiment, the UI operation mode may be a simple display after the portable electronic device 100 is unlocked.

Figure 11:
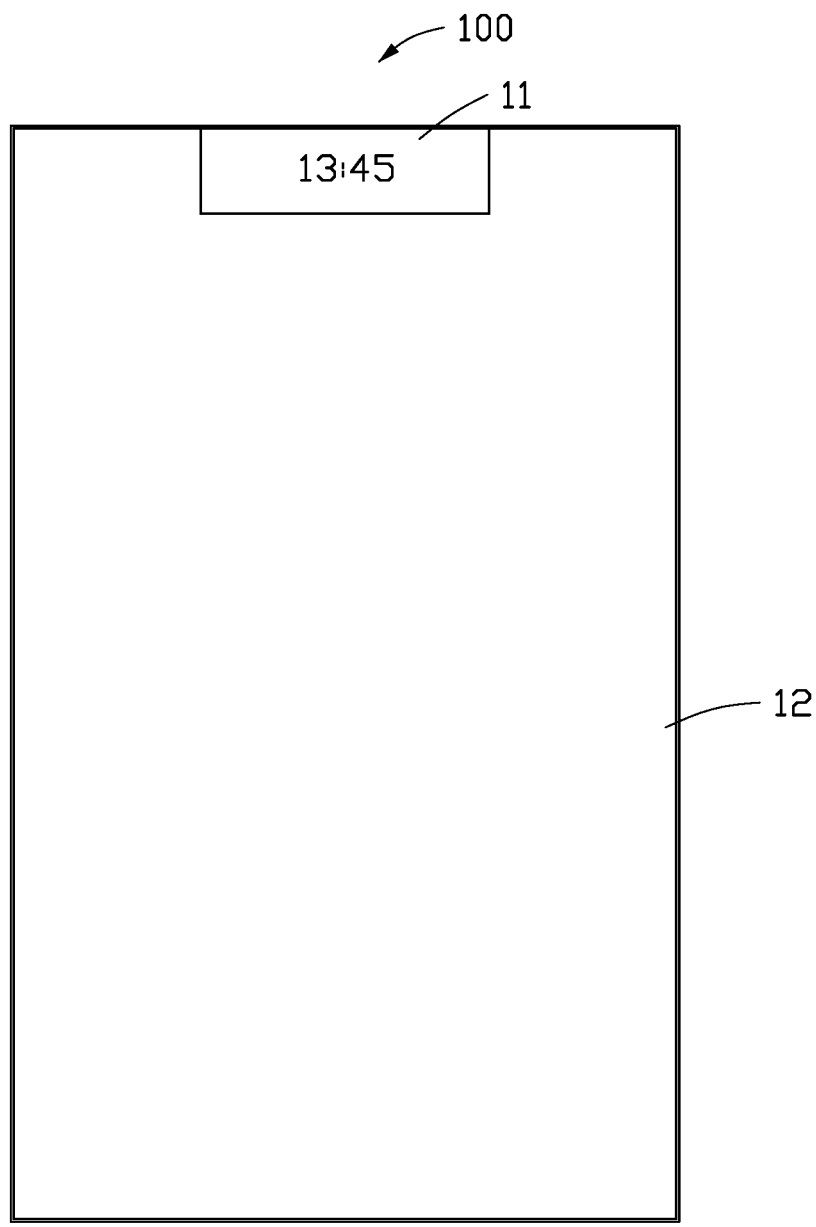
FIG. 11 is a view of an embodiment of an interface of a portable electronic device in a sleep mode.

Referring to FIG. 11, in the sleep mode, the first display 11 is switched-on, the second display 12 is switched-off, and the camera unit 152, the proximity sensor 154, and the light sensor 156 are switched-off. The first display 11 displays current time information.

Figure 12:
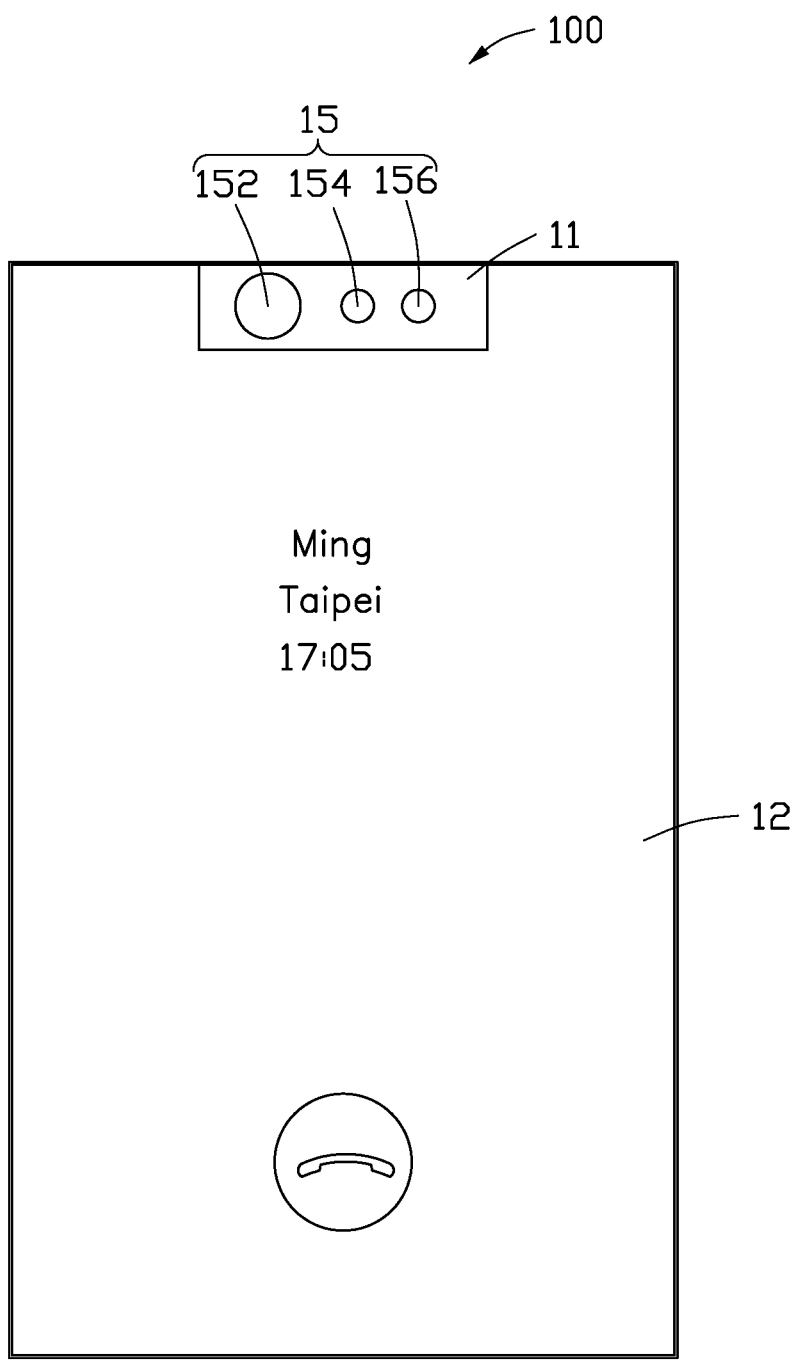
FIG. 12 is a view of an embodiment of an interface of a portable electronic device in a call mode.

Referring to FIG. 12, in the call mode, the second display 12 is switched-on, the camera unit 152 is switched-off, the proximity sensor 154 is switched-on, and the light sensor 156 is switched-off. In addition, in the call mode, the first display 11 is entirely or partially switched-off. Partially switched-off means that external light can pass the first display 11 and be received by the proximity sensor 154, this function is not affected by the light being emitted by the RGB LED 116. The second display 12 displays a call interface, the proximity sensor 154 receives the external light to determine the distance between the portable electronic device 100 and the user. When the distance between the portable electronic device 100 and the user is smaller than a predetermined distance is determined which indicates that the portable electronic device 100 is likely to be close to the ear of the user and the user does not need to have a view of the second display 12, the second display 12 is switching off to save power.

Figure 13:
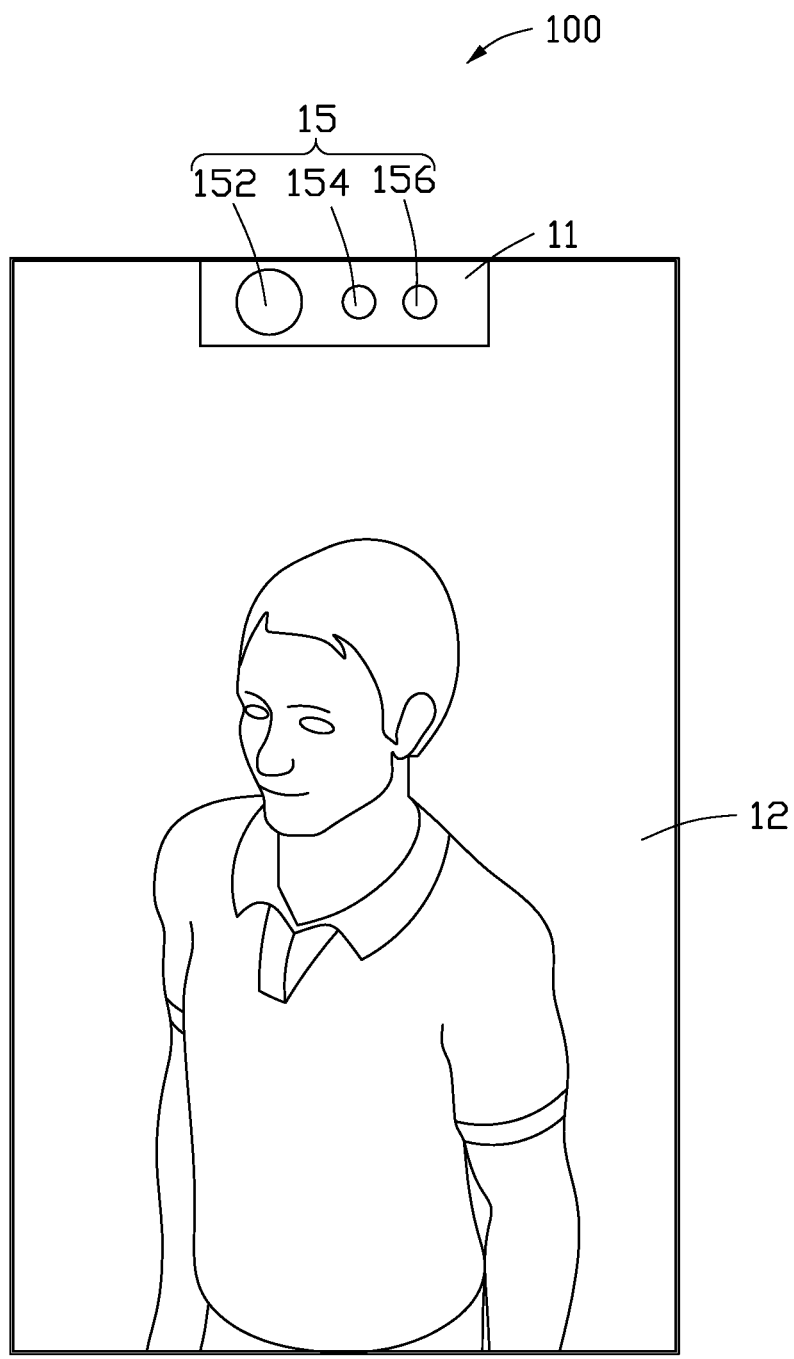
FIG. 13 is a view of an embodiment of an interface of a portable electronic device in a camera mode.

Referring to FIG. 13, in the camera mode, the second display 12 is switched-on, the camera unit 152 is switched-on, the proximity sensor 154 is switched-off, and the light sensor 156 is switched-off. In addition, in the camera mode, the first display 11 is entirely or partially switched-off. Partially switched-off means that external light can pass the first display 11 and be received by the camera module 152, this function is not affected by the light being emitted by the RGB LED 116. The second display 12 displays a capturing interface of the camera unit 152.

Figure 14:
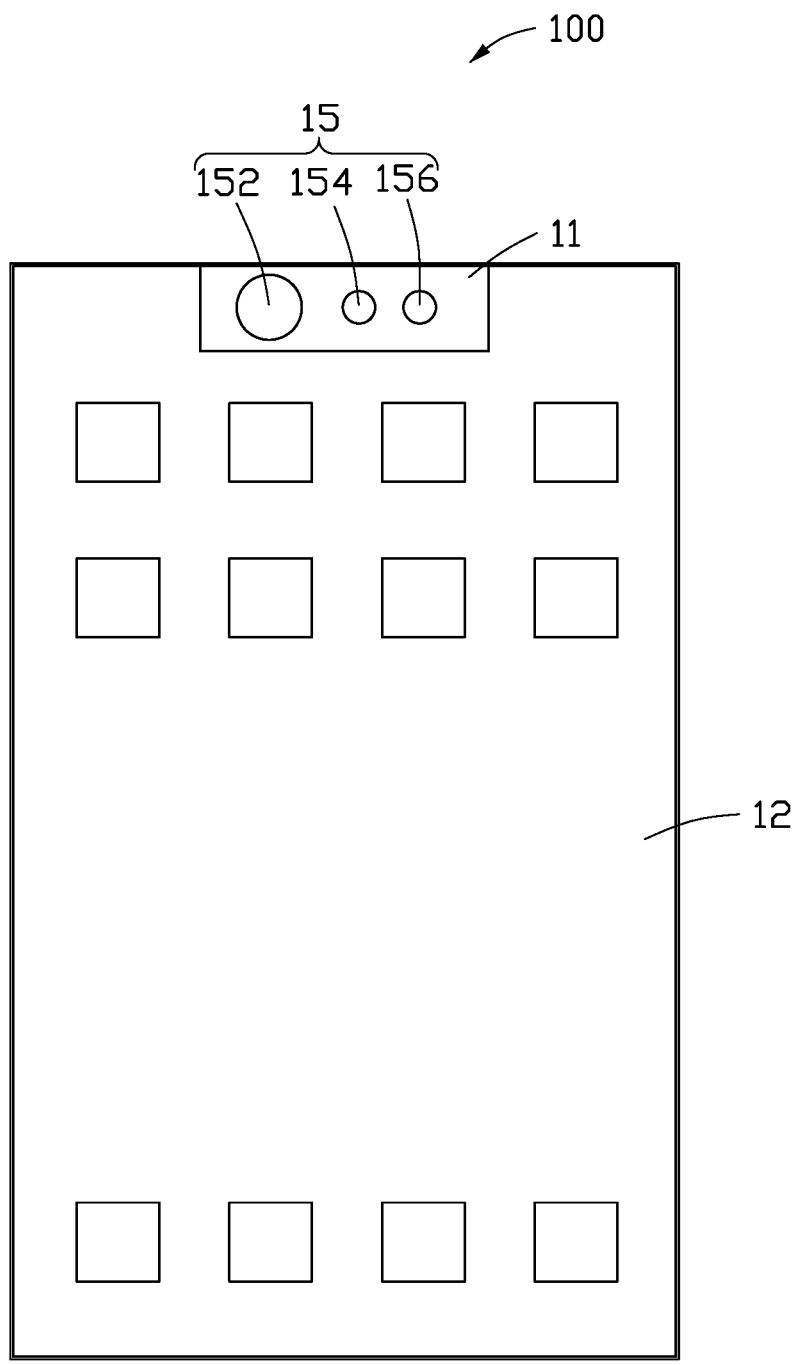
FIG. 14 is a view of an embodiment of an interface of a portable electronic device in a light detecting mode.

Referring to FIG. 14, in the light detecting mode, the second display 12 is switched-on, the camera unit 152 is switched-off, the proximity sensor 154 is switched-off, and the light sensor 156 is switched-on. In addition, in the light detecting mode, the first display 11 is entirely or partially switched-off. Partially switched-off means that external light can pass the first display 11 and be received by the light sensor 156, this function is not affected by the light being emitted by the RGB LED 116. The timer 182 can count down predetermined time periods for the light sensor 156 to detect brightness of external light. The processor 17 can adjust a display brightness of the second display 12 according to the detected brightness of external light.

Figure 15:
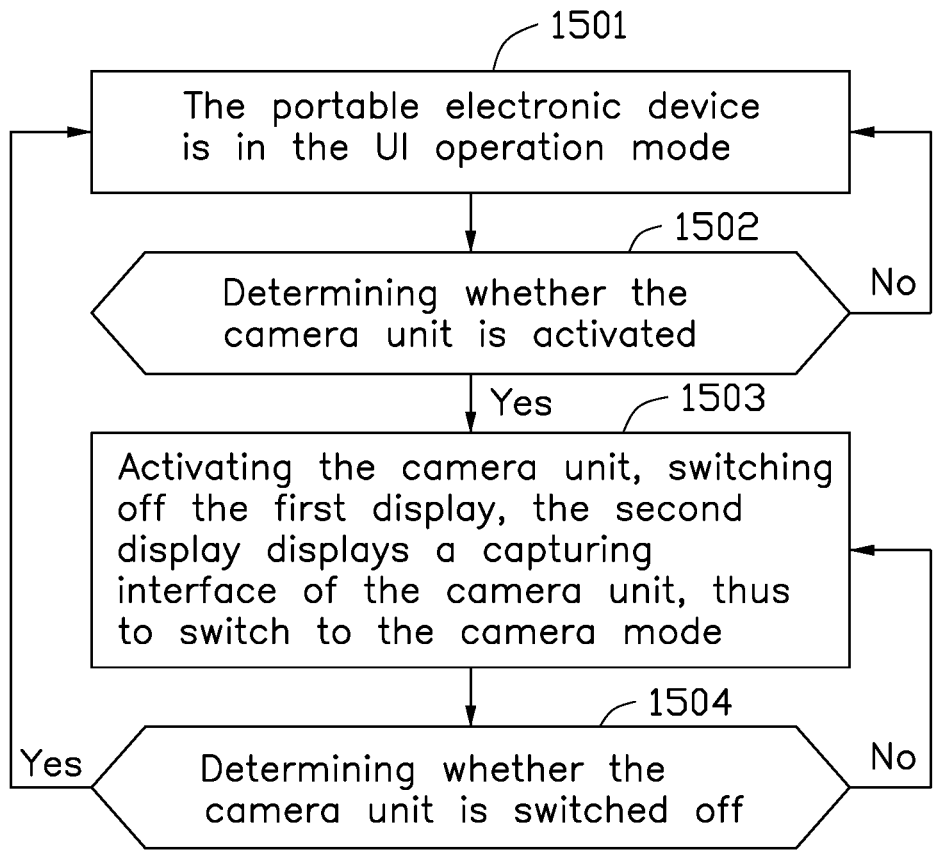
FIG. 15 is a flow chart of a first embodiment of an operating method of the portable electronic device.

FIG. 15 illustrates a flowchart presented in accordance with a first embodiment of an operating method of the portable electronic device 100 when switching from the UI operation mode to the camera mode. The operating method of the portable electronic device 100 can be carried out using the configurations illustrated in FIGS. 1-14, for example, and various elements of these figures are referenced in example method. Each block shown in FIG. 15 represents one or more processes, methods, or subroutines, carried out in the exemplary method. Furthermore, the illustrated order of blocks is by example only and the order of the blocks can change according to the present disclosure. Additional blocks may be added or fewer blocks may be utilized, without departing from this disclosure. The exemplary method can begin at block 1501.

At block 1501, the portable electronic device 100 is in the UI operation mode. In this embodiment, the portable electronic device 100 is operated in the UI operation mode. In the UI operation mode, the first display 11 is switched-on, the second display 12 is switched-on, and the camera unit 152, the proximity sensor 154, and the light sensor 156 are switched-off. In the UI operation mode, the second display 12 displays a user interface, which may include application icons or application interfaces, etc. The first display 11 displays a minor interface, which may include a signal connection status icon, a battery icon, and a time information, etc. In at least one embodiment, the UI operation mode may be a simple display after the portable electronic device 100 is unlocked.

At block 1502, determining whether the camera unit 152 is activated. The processor 17 determines whether the camera unit 152 is activated, the user may activate the camera unit 152 by clicking a camera icon displayed on the second display 12. If determining the camera unit 152 is not activated, the procedure goes back to block 1501; if determining the camera unit 152 is activated, the procedure goes to block 1503.

At block 1503, activating the camera unit 152, switching off the first display 11, and the second display 12 displays a capturing interface of the camera unit 152, thus to switch to the camera mode. Pictures captured by the camera unit 152 can be stored to the storage 18.

At block 1504, determining whether the camera unit 152 is switched off. The processor 17 determines whether the camera unit 152 is switched off, the user may switch off the camera unit 152 by operating the capturing interface of the camera unit 152 displayed on the second display 12. If determining the camera unit 152 is not switched off, the procedure goes back to block 1503; if determining the camera unit 152 is switched off, the procedure goes to block 1501.

Figure 16:
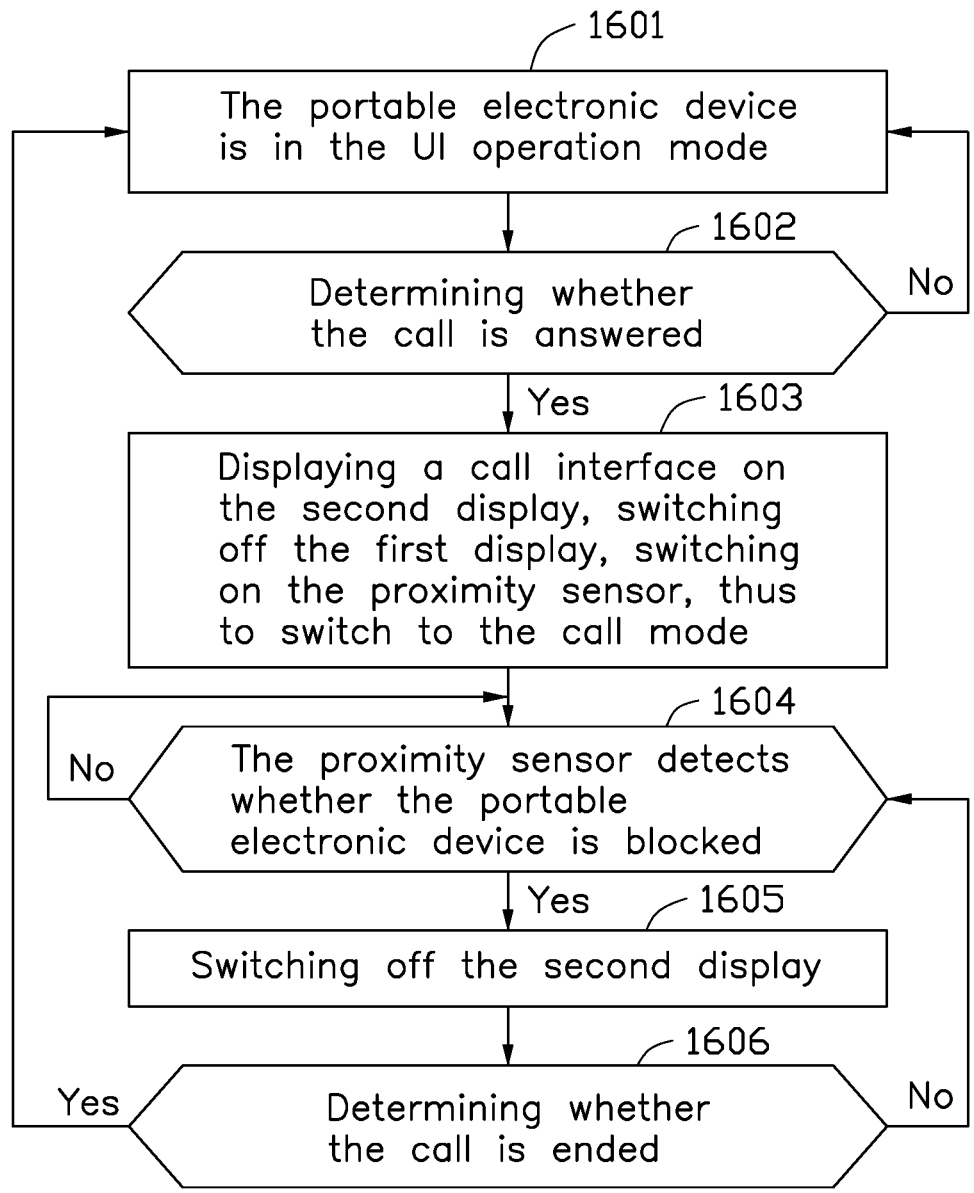
FIG. 16 is a flow chart of a second embodiment of an operating method of the portable electronic device.

FIG. 16 illustrates a flowchart is presented in accordance with a second embodiment of an operating method of the portable electronic device 100 switching from the UI operation mode to the call mode. The operating method of the portable electronic device 100 can be carried out using the configurations illustrated in FIGS. 1-14, for example, and various elements of these figures are referenced in example method. Each block shown in FIG. 16 represents one or more processes, methods, or subroutines, carried out in the exemplary method. Furthermore, the illustrated order of blocks is by example only and the order of the blocks can change according to the present disclosure. Additional blocks may be added or fewer blocks may be utilized, without departing from this disclosure. The exemplary method can begin at block 1601.

At block 1601, the portable electronic device 100 is in the UI operation mode. In this embodiment, the portable electronic device 100 is operated in the UI operation mode. In the UI operation mode, the first display 11 is switched-on, the second display 12 is switched-on, and the camera unit 152, the proximity sensor 154, and the light sensor 156 are switched-off. In the UI operation mode, the second display 12 displays a user interface, which may include application icons or application interfaces, etc. The first display 11 displays a minor interface, which may include a signal connection status icon, a battery icon, and a time information, etc. In at least one embodiment, the UI operation mode may be a display status after the portable electronic device 100 is unlocked.

At block 1602, determining whether the call is answered. The processor 17 determines whether the call is answered by the user, the user may answer the call by operating a phone icon displayed on the second display 12. If determining the call is not answered, the procedure goes back to block 1601; if determining the call is answered, the procedure goes to block 1603.

At block 1603, displaying a call interface on the second display 12, switching off the first display 11, switching on the proximity sensor 154, thus switching to the call mode.

At block 1604, the proximity sensor 154 detects whether the portable electronic device 100 is blocked from the user. When user's ear is close to the portable electronic device 100, the proximity sensor 154 detects a distance between the portable electronic device 100 and a block object (such as the user). The processor 17 determines whether the detected distance is smaller than a predetermined distance. If determining the detected distance is greater than the predetermined distance, the procedure goes back to block 1604; if determining the detected distance is smaller than the predetermined distance, the procedure goes to block 1605.

At block 1605, switching off the second display 12.

At block 1606, determining whether the call is ended. If determining the call is not ended, the procedure goes back to block 1604; if determining the call is ended, the procedure goes back to block 1601.

Figure 17:
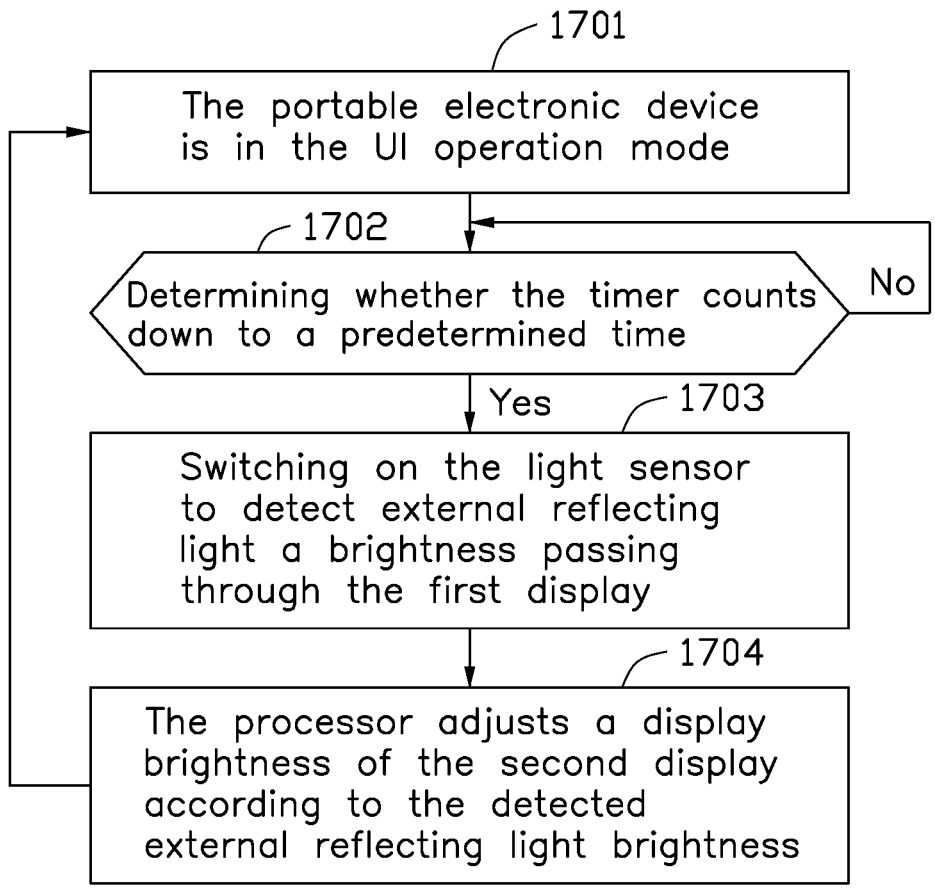
FIG. 17 is a flow chart of a third embodiment of an operating method of the portable electronic device.

FIG. 17 illustrates a flowchart is presented in accordance with a third embodiment of an operating method of the portable electronic device 100 switching from the UI operation mode to the light detecting mode. The operating method of the portable electronic device 100 can be carried out using the configurations illustrated in FIGS. 1-14, for example, and various elements of these figures are referenced in example method. Each block shown in FIG. 17 represents one or more processes, methods or subroutines, carried out in the exemplary method. Furthermore, the illustrated order of blocks is by example only and the order of the blocks can change according to the present disclosure. Additional blocks may be added or fewer blocks may be utilized, without departing from this disclosure. The exemplary method can begin at block 1701.

At block 1701, the portable electronic device 100 is in the UI operation mode. In this embodiment, the portable electronic device 100 is operated in the UI operation mode. In the UI operation mode, the first display 11 is switched-on, the second display 12 is switched-on, the camera unit 152, the proximity sensor 154, and the light sensor 156 are switched-off In the UI operation mode, the second display 12 displays a user interface, which may include application icons or application interfaces, etc. The first display 11 displays a minor interface, which may include a signal connection status icon, a battery icon, and a time information, etc. In at least one embodiment, the UI operation mode may be a display status after the portable electronic device 100 is unlocked.

At block 1702, determining whether the timer 182 has counted down to a predetermined time period. The timer 182 presets the predetermined time period, the portable electronic device 100 activates the light sensor 156 each time the timer 182 counts down to the predetermined time period. If determining not counting down to the predetermined time period, the procedure goes back to block 1702; if determining counting down to the predetermined time period, the procedure goes to block 1703.

At block 1703, switching on the light sensor 156 to detect a brightness of external light passing through the first display 11.

At block 1704, the processor 17 adjusts a display brightness of the second display 12 according to the detected brightness of external light.

Figure 18:
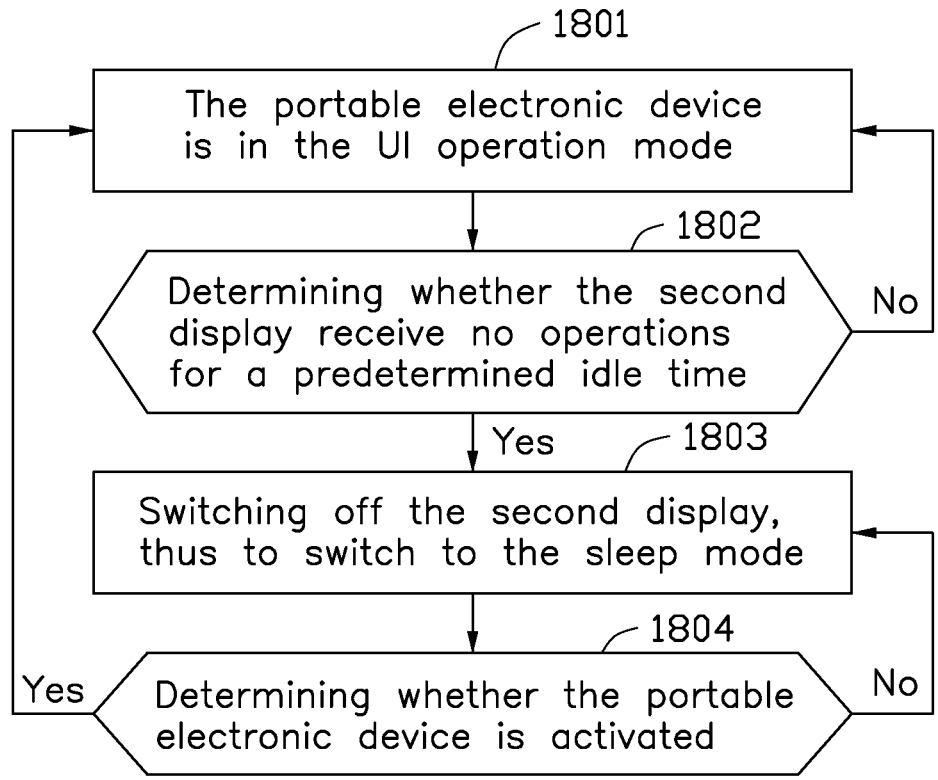
FIG. 18 is a flow chart of a fourth embodiment of an operating method of the portable electronic device.

FIG. 18 illustrates a flowchart is presented in accordance with a fourth embodiment of an operating method of the portable electronic device 100 switching from the UI operation mode to the sleep mode. The operating method of the portable electronic device 100 can be carried out using the configurations illustrated in FIGS. 1-14, for example, and various elements of these figures are referenced in example method. Each block shown in FIG. 18 represents one or more processes, methods or subroutines, carried out in the exemplary method. Furthermore, the illustrated order of blocks is by example only and the order of the blocks can change according to the present disclosure. Additional blocks may be added or fewer blocks may be utilized, without departing from this disclosure. The exemplary method can begin at block 1801.

At block 1801, the portable electronic device 100 is in the UI operation mode. In this embodiment, the portable electronic device 100 is operated in the UI operation mode. In the UI operation mode, the first display 11 is switched-on, the second display 12 is switched-on, the camera unit 152, the proximity sensor 154, and the light sensor 156 are switched-off. In the UI operation mode, the second display 12 displays a user interface, which may include application icons or application interfaces, etc. The first display 11 displays a minor interface, which may include a signal connection status icon, a battery icon, and a time information, etc. In at least one embodiment, the UI operation mode may be a display status after the portable electronic device 100 is unlocked.

At block 1802, determining whether the second display 12 detects no trigger event for a predetermined idle time. If determining the second display 12 detects no trigger event for a predetermined idle time, the procedure goes to block 1803; otherwise, the procedure goes back to block 1802.

At block 1803, switching off the second display 12, thus switching to the sleep mode. In the sleep mode, the first display 11 may display the time information.

At block 1804, determining whether the portable electronic device 100 is activated. The processor 17 determines whether an activating operation or an unlocking operation is received to activate the portable electronic device 100 in the sleep mode. If determining the portable electronic device 100 is not activated, the procedure goes back to block 1804; if determining the portable electronic device 100 is activated, the procedure goes back to block 1801.

According to the portable electronic devices 100 as disclosed, the first display 11 and the second display 12 are arranged close together, thus improving and increasing screen-to-body ratio. The portable electronic devices 100 as disclosed, the optical module 15 is arranged below the first display 11 and switching the working status of the first display 11 and the optical module 15 are carried out through the operation modes, thereby the displays of the first display 11 and the second display 12 can be optimized.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A portable electronic device comprising:
   a housing;
   a first display being a transparent display and a micro light emitting diode (LED) display;
   a circuit board;

an optical module electrically connected to the circuit board and positioned below the first display, the optical module comprising a light sensor;

wherein the first display, the optical module, and the circuit board are received in the housing, the optical module is configured to receive external light passing through the first display;

wherein the portable electronic device further comprises a timer and a second display, the portable electronic device is adapted to be operated in and switchable between a first mode and a second mode; the first display is switched-on and the optical module is switched-off in the first mode, the first display is partially switched-off and the optical module is switched-on in the second mode; and wherein when the portable electronic device detects the timer counts down to a predetermined time period, the portable electronic device switches from the first mode to the second mode, the light sensor is switched on to detect a brightness of external light, and a brightness of the second display is adjusted according to the brightness of the external light detected by the light sensor;

wherein the first display comprises at least one base board, a plurality of electrodes, and a plurality of RGB light-emitting diodes (LEDs); the plurality of electrodes and the plurality of RGB LEDs are arranged on the at least one base board, the plurality of electrodes are transparent electrodes and electrically connected to the plurality of RGB LEDs, the plurality of electrodes are configured to switch the plurality of RGB LEDs on or off;

wherein the first display comprises a first area and a second area, the optical module is arranged on a lower surface of the at least one base board and correspondingly located in the first area, an density of the plurality of RGB LEDs located in the first area is lower than a density of the plurality of RBG LEDs located in the second area.

2. The portable electronic device as claimed in claim 1, wherein no electrode and no RBG LEDs are arranged in the first area, the plurality of electrodes and the plurality of RGB LEDs are arranged in the second area.

\* \* \* \* \*